United States Patent [19]
Pellerin

[11] Patent Number: 5,505,160
[45] Date of Patent: Apr. 9, 1996

[54] FEED DISTRIBUTING APPARATUS

[75] Inventor: Romain Pellerin, St-Adrien-de-Ham, Canada

[73] Assignee: A. Pellerin et Fils Ltee., Quebec, Canada

[21] Appl. No.: 291,606

[22] Filed: Aug. 16, 1994

[51] Int. Cl.⁶ .................................................. A01K 5/02
[52] U.S. Cl. .................................................. 119/57.1
[58] Field of Search .................................... 119/57.1, 57.5, 119/57.6, 57.92

[56] References Cited

U.S. PATENT DOCUMENTS

| 1,547,686 | 7/1925 | Rieff | 119/57.6 |
| 2,659,346 | 11/1953 | Paparazzo et al. | 119/57.6 |
| 3,625,184 | 12/1971 | Patz | 119/52 |
| 4,672,917 | 6/1987 | Fox | 119/57.1 |
| 4,981,107 | 1/1991 | Beaudoin et al. | 119/56.2 |
| 5,069,165 | 12/1991 | Rousseau | 119/57.6 |
| 5,353,740 | 10/1994 | Pellerin | 119/57.92 |

FOREIGN PATENT DOCUMENTS

| 1158123 | 5/1985 | U.S.S.R. | 119/57.5 |

*Primary Examiner*—Thomas Price
*Attorney, Agent, or Firm*—Michael D. Bednarek; Marks & Murase

[57] ABSTRACT

The apparatus is adapted for a repetitive delivering of feeds to livestock set according to a predetermined configuration and where the animals are allowed to eat the feeds directly in the apparatus. The apparatus is suspended to an overhead rail extending above and in front of the animals. The apparatus comprises a receptacles consisting of a hopper for receiving fodder and may also comprise a container for receiving hay. The hopper is provided with a lateral opening for allowing the animals to eat directly therein and the container has wire screen walls for retaining hay while allowing livestock to eat the hay through meshes in the walls. When used together, the hopper and the container are moved in tandem and are supported over the ground by a carriage unit. The carriage unit comprises electrical motors and controlling equipment for regulating the movement of the apparatus along the overhead rail. The apparatus is used for supplying feeds in repetitive short quantities over few hours each day, thereby helping the digestion of the animals.

20 Claims, 5 Drawing Sheets

FEED DISTRIBUTING APPARATUS

FIELD OF THE INVENTION

The present invention relates to a feed distributing apparatus for repetitive delivering of feeds to livestock set according to a predetermined configuration and in front of which an overhead rail extends.

BACKGROUND OF THE INVENTION

The animal of a livestock are generally confined in indoor or outdoor stalls positioned according to a specific layout depending substantially on the available space and the required accessibility. One usual layout is to have the animals side-by-side in rows separated by passages for feeding and cleaning purposes. At feeding time, the farmer generally deposits individual rations of fodder and hay on the ground or in mangers in front of each animal. This repetitive duty is tedious and time consuming, especially if there are numerous animals to feed. Additionally, when the hay is stored in rolled hay bales, the farmers usually unroll the bales on the ground in front of the animals of the same row for speeding up the distribution. Like when individual feed rations are deposited directly on the ground, the hay becomes rapidly contaminated with other substances and is scattered by the animals all around the stalls, resulting in a waste of feeds. As for mangers, they occupy spaces and require regular cleaning.

Over the years, some feeding systems were invented for the automation of feed distribution. Among those feeding systems, some comprise an overhead rail with a suspended device passing in front of each animal and which prepares and delivers individual feed rations. However, these systems are costly, bulky, often too sophisticated for the needs of average farmers and are not well adapted for distributing hay. Examples of such systems are described in U.S. Pat. Nos. 4,981,107 and 5,069,165.

Moreover, conventional manual distribution and prior art devices are not well adapted for an optimized distribution consisting of giving small amounts of feeds to each animal during a given period of time. These repetitive small meals stimulate the animals to eat more and to better digest the feeds, therefore helping the livestock to be in good health.

SUMMARY OF THE INVENTION

The object of the present invention is to provide an apparatus adapted for an optimized distribution of feeds to livestock set according to predetermined configuration and where the animals are allowed to eat fodder and possibly hay directly in the apparatus.

More particularly, the object of the present invention is to provide a feed distributing apparatus for repetitive delivering of feeds to livestock set according to a predetermined configuration and in front of which an overhead rail extends, the apparatus comprising:

hopper means for receiving fodder and having at least one lateral opening adjacent the bottom thereof for allowing livestock to directly eat the fodder internally settling substantially by gravity near the opening; and a carriage unit comprising:
carriage means operatively engageable with the overhead rail and attached to the hopper means for supporting the hopper means above the ground and allowing movement thereof along the overhead rail;

driving means operatively engageable with the overhead beam for moving the hopper means along the overhead rail; and control means for controlling the driving means.

The object of the present invention is also to provide a feed distributing apparatus for repetitive delivering of feeds to livestock set according to a predetermined configuration and in front of which an overhead rail extends, the apparatus comprising:

hopper means for receiving fodder and having at least one lateral opening adjacent the bottom thereof for allowing livestock to directly eat the fodder internally settling substantially by gravity near the opening;

container means for receiving hay, the container means having a wire screen wall on at least one lateral side thereof for retaining hay and allowing livestock to directly eat the hay through meshes in the wire screen wall; and a carriage unit comprising:
first carriage means operatively engageable with the overhead rail and attached to the hopper means for supporting the hopper means above the ground and allowing movement thereof along the overhead rail;

second carriage means operatively engageable with the overhead rail and attached to the container means for supporting the container means above the ground and allowing movement thereof along the overhead rail;

hitching means for operatively attaching in tandem the hopper means and the container means;

driving means operatively engageable with the overhead beam for moving the hopper means and the container means along the overhead rail; and control means for controlling the driving means.

A non restrictive description of preferred embodiments will now be given with reference to the appended drawings.

DESCRIPTION OF PREFERRED EMBODIMENTS

Figure 1:
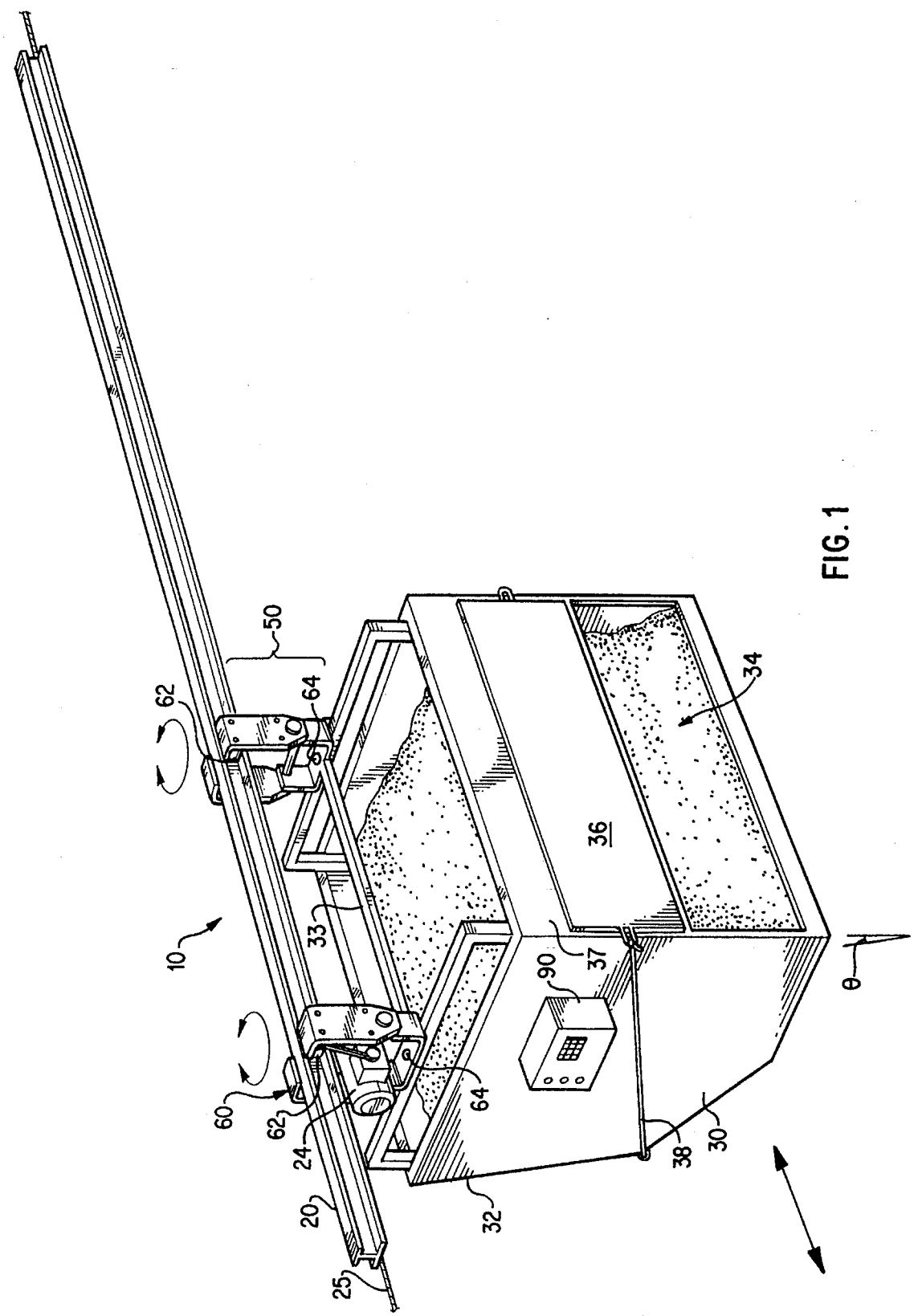
FIG. 1 is a perspective view of the apparatus according to the a first embodiment of the present invention.
Figure 2:
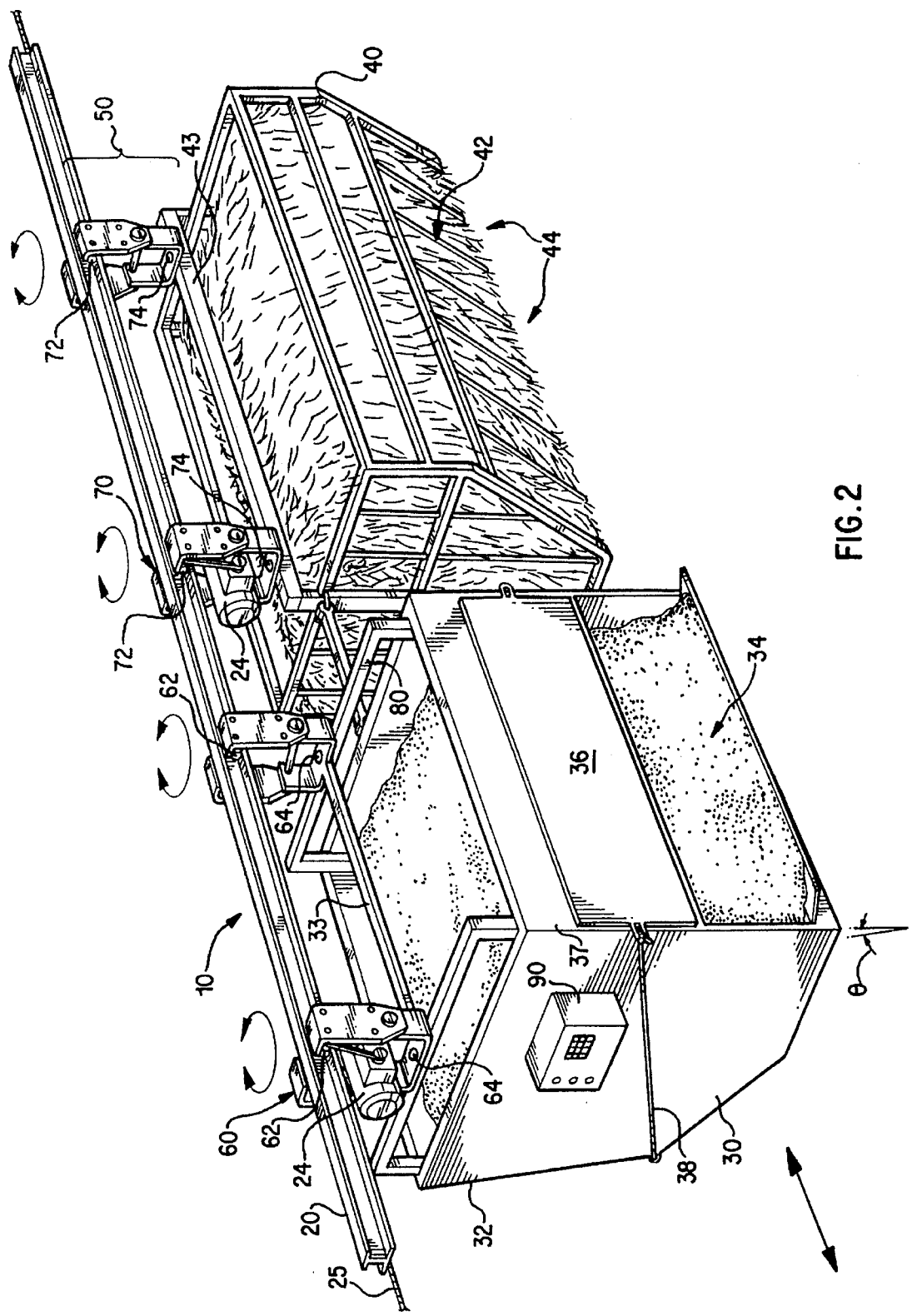
FIG. 2 is a perspective view of the apparatus according to another embodiment of the present invention.

As shown in FIGS. 1 and 2, the apparatus 10 is hung under an overhead rail 20 extending above and in front of animals of a livestock set in a location such as a barn or even outdoor, according to a predetermined configuration. When installing the overhead rail 20, the layout is so that the apparatus 10 can be easily reached by the animals for allowing them to eat the feeds directly therein. These animals may be arranged in specific groups where each group has its own feeding requirements, such as the quantity of feeds to eat, the travelling speed of the apparatus 10, etc. Of course, the overhead rail 20 may comprise curves, storage locations, switching systems or any other additional feature that can usually be found in devices using overhead rails.

Figure 3:
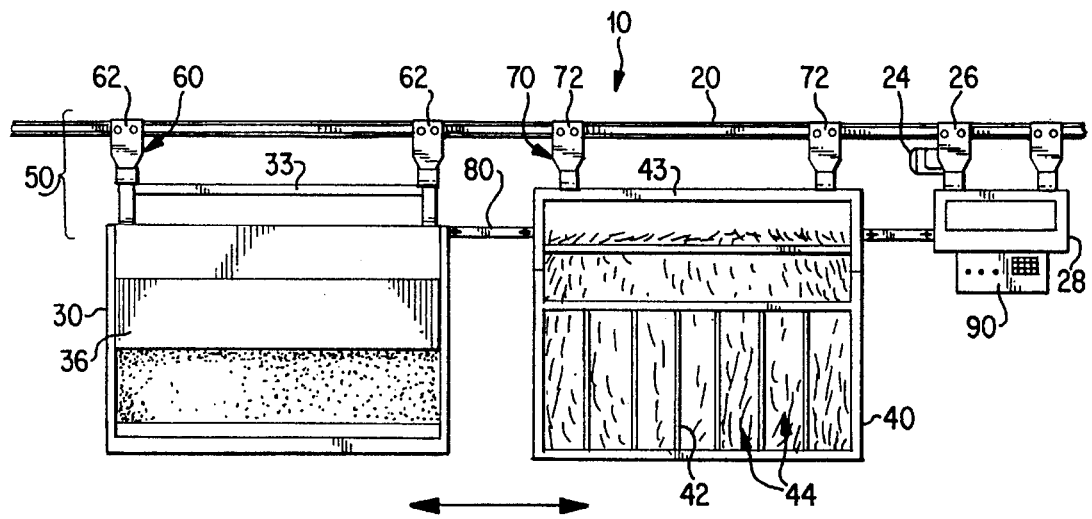
FIG. 3 is an elevation view of an alternative embodiment of the apparatus shown in FIG. 2.
Figure 4:
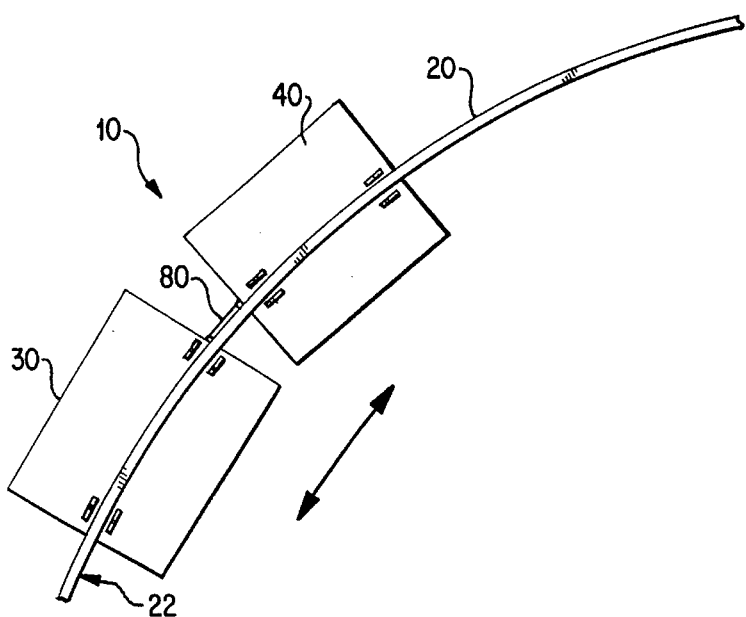
FIG. 4 is a schematic upper view of the apparatus of FIG. 2, showing the apparatus in a curved section of the overhead rail.

The purpose of the apparatus 10 in FIG. 1 is to feed the livestock with feeds substantially consisting of fodder. The fodder is preferably a mix of grains and coarsely chopped stalks. The apparatus 10 comprises a hopper 30 for receiving the fodder. Optionally, another receptacle may be provided as illustrated in FIGS. 2 to 4. The second receptacle is preferably a container 40 for receiving the hay. Of course, equivalent elements not strictly falling within the grammatical definition of these words but doing substantially the same function are also suitable.

The hopper 30, preferably having an opened top for easy the loading of the fodder therein, has solid walls 32 and at least one lateral opening 34 adjacent the bottom thereof and extending longitudinally on a side allowing livestock to eat the fodder directly through the opening 34. The opening 34 may be closed by a hinged door 36 kept opened during livestock feeding by a locking means, such as the elastic 38. Of course, more than one opening 34 may be provided on other sides of the hopper 30 for simultaneous distribution to animals on two rows and in a head-to-head configuration.

The design of the hopper 30 and the usual cohesion of the fodder are so that the fodder settles substantially by gravity near the opening 34 without exiting in large quantities. Any person skilled in the art can easily design the hopper 30 for that purpose. For example, the front wall 37 may be inwardly inclined so that the top of the hopper 30 is smaller than its bottom for preventing compaction. Referring to FIGS. 1 and 2, the front wall 37 may be inclined of an angle θ greater than the angle of inclination of the rear wall.

Figure 5:
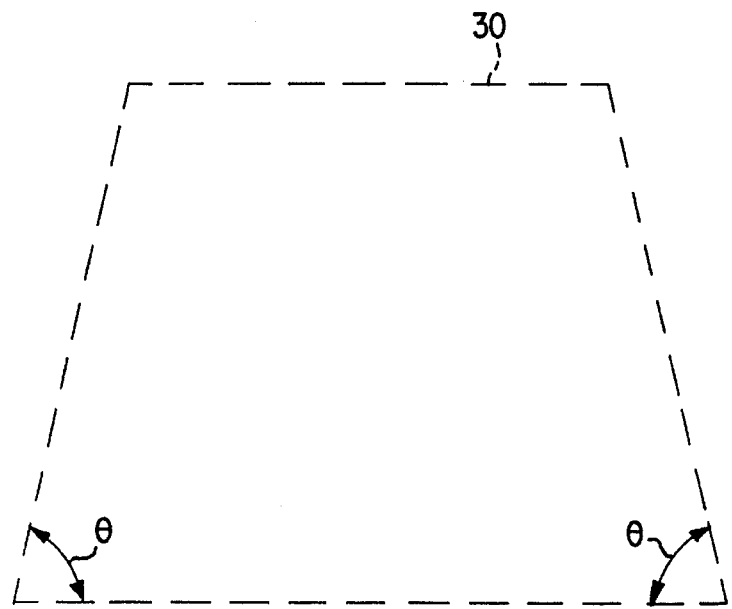
FIG. 5 is a schematic and simplified side view of the hopper, shown the inclination of the walls according to a preferred embodiment of the present invention.

If two openings are provided in the hopper 30 for the simultaneous distribution to animals on two rows and in a head-to-head configuration, both opposite walls may be inclined of an angle θ, as shown in FIG. 5, for preventing compaction. It should be noted that the angle is not necessarily the same for the two walls.

Additionally, the muzzle of the animals and the small vibrations when the apparatus 10 is moving may contribute to the continuous flow of fodder near the opening 34. The inclined rear wall helps guiding the gravity falling fodder near the opening 34.

In FIGS. 2 and 3, the container 40 is preferably made of wire screen walls 42. The container 40 may further have an opened top for loading purposes and a funnel-shaped cross-section. Although the container 40 has a cage-like structure, the container 40 only has to have a wire screen wall 42 on at least one lateral side thereof for retaining hay while allowing livestock to eat the hay through meshes 44 in the wall 42.

When used together, the hopper 30 and the container 40 are attached to a carriage unit 50 comprising a first carriage 60 for supporting the hopper 30 above the ground and a second carriage 70 for supporting the container 40 above the ground, if any.

Both first carriage 60 and second carriage 70 comprise respectively wheels 62 and 72 operatively engageable with the overhead rail 20 for allowing movement along it. The carriages 60 and 70 are preferably connected respectively to the upper part of the hopper 30 and of the container 40 by means of swivels, respectively numbered 64 and 74. As shown in FIG. 4, the swivels allow the apparatus 10 to move along a curved section 22 of the overhead rail 20. The longitudinal beams 33 and 43 may be provided with a plurality of holes (not shown) allowing the swivels to be set in a suitable location depending on the design of the curves.

When the hopper 30 and the container 40 are used in tandem, hitching means 80 are provided in the carriage unit 50 for securing together the adjacently disposed hopper 30 and container 40. Such hitching means may comprise a solid bar 82 or a chain (not shown) operatively attached between the hopper 30 and the container 40. Of course, any other mechanical equivalent may be suitable as apparent to a person skilled in the art.

Figure 6:
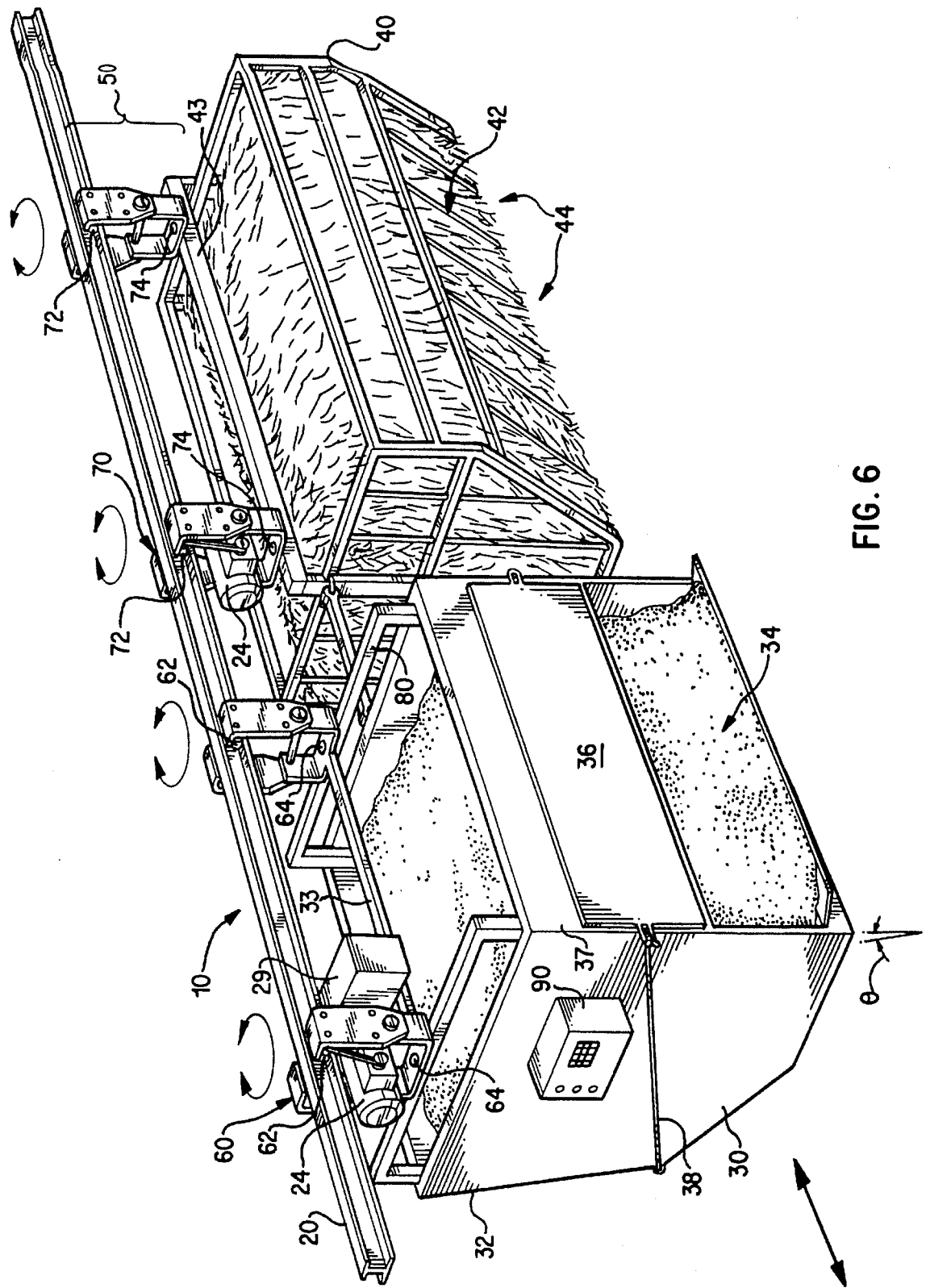
FIG. 6 is a perspective view similar to FIG. 2, showing the apparatus with a battery.

The carriage unit 50 further comprises driving means engageable with the overhead beam 20 for translating the hopper 30 and the container 40 along the overhead rail 20. The driving means preferably comprises at least one electrical motor 24 mechanically connected to wheels engageable with the overhead beam 20. Such wheels may be the wheels 62 or 72, or wheels 26. Power is delivered to the electrical motor 24 by electric contacts 25 extending along the sides of the overhead rail 20. Alternatively, one or more batteries 29 (FIG. 6) may be used for providing the electrical power.

In the embodiment shown in FIG. 1, the electrical motor 24 is directly mounted on the first carriage 60 or the second carriage 70, if any. It should be understood that this definition also encompasses the embodiment were the driving means is mounted on the first carriage 60 and the second carriage 70. If there is only one carriage provided with the driving means, the other one is simply towed or pushed depending on the travelling direction.

Alternatively, as shown in FIG. 3, the driving means may be on an independent driving carriage 28. The driving carriage 28 may be a device for another distribution purpose or simply another apparatus (not shown) according to the present invention.

Control means for controlling the driving means are further provided for regulating the movement of the apparatus 10 by modifying, for example, the power supplied to the electrical motor or motors 24. The control means comprises a control panel 90 which may be provided directly on the apparatus 10 or on a remote location, such as the wall in a barn. Programmable computer and timer, positioning means and other controlling equipment may be included in the control means, as it can be apparent for a person skilled in the art.

In use, the hopper 30 is loaded with fodder. The container 40 is loaded with hay if one used. The farmer then sets the control means for automatically feeding one or several groups of animals during a given period of time. The quantity of feeds supplied to the animals may be controlled by varying the time the apparatus 10 is feeding them. The apparatus 10 may be stopped completely for short periods of time in front of each animal or may be slowly moved in front of them during the whole feeding time. A combination of these sequences is also possible. The animals will then eat fodder in the hopper 30 through the opening 34 when it is in their range. The feeds delivered with the apparatus 10 is thus clean and supplied in short quantities and thereby helping the digestion of the animals for instance.

Preliminary results show that the animals eat more feeds when the apparatus 10 is constantly moving because they grasp a maximum quantity of feeds in their mouth before the apparatus 10 is out of their range. This way of doing is believed to be very efficient for feeding livestock.

Typically, the feeding time of a group of 20 cows set in a row of about 25 meters is between 6 and 8 hours, with the apparatus travelling back and forth at about 5 meters per minute (8 cm/s). Since the feeding time is directly proportional to the travelling speed, the feeding time may be reduced with a faster setting.

of course, the hopper 30 described hereinabove may be used in conjunction with a container 40 as illustrated, or with another device, such as a rolled hay bale distributing apparatus.

Figure 7:
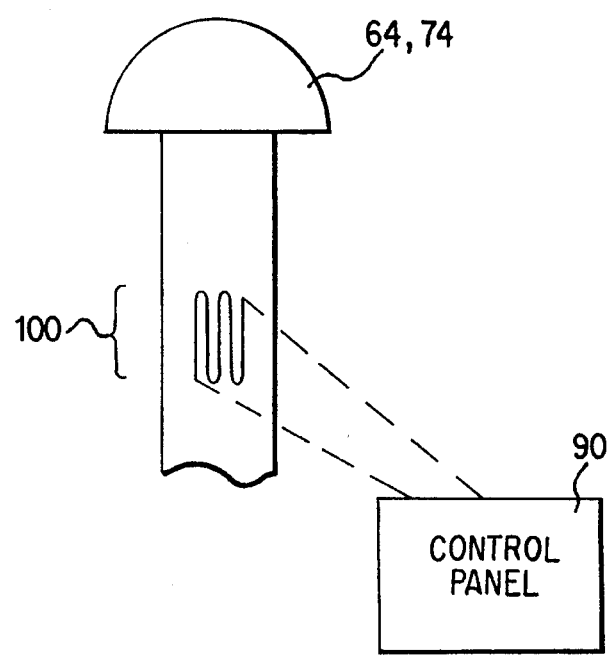
FIG. 7 is a schematic view of a stain gauge used in an embodiment of the balance that may be provided with the apparatus according to a preferred embodiment of the present invention.

Moreover, it is possible to provide a balance on the hopper 30, container 40, or both, for measuring the quantity of feeds eaten in a group. The balance may comprise strain gauges 100 (FIG. 7), which are preferably mounted on the swivels 64, 74 or both. An electrical circuit connects the gauges to the control panel 90. Alternatively, the balance may be a hydraulically actuated balance (not shown).

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A feed distributing apparatus for repetitive delivering of feeds to livestock set according to a predetermined configuration and in front of which an overhead rail extends, the apparatus comprising:
   hopper means for receiving fodder and having at least one lateral opening positioned in a side wall of the hopper means and spaced above the bottom thereof, said lateral opening defining a means for allowing livestock to directly eat the fodder internally settling substantially by gravity near the opening; and
   a carriage unit comprising:
      carriage means operatively engageable with the overhead rail and attached to the hopper means for supporting the hopper means above the ground and allowing movement thereof along the overhead rail;
      driving means operatively engageable with the overhead beam for moving the hopper means along the overhead rail; and
      control means for controlling power supplied to the driving means for regulating movement of the hopper means along the overhead rail.

2. An apparatus according to claim 1, wherein the driving means comprises an electrical motor mechanically connected to wheels operatively engageable with the overhead rail.

3. An apparatus according to claim 2, wherein a battery is electrically connected to the electrical motor for supplying power to the motor.

4. An apparatus according to claim 1, wherein the carriage means comprises swivels having a respective vertical axis for allowing movement of the hopper means along curved sections of the overhead rail.

5. An apparatus according to claim 4, further comprising a balance for measuring the weight of the hopper means, the balance comprising at least one strain gauge mounted on the swivels and electrically connected to a control panel.

6. An apparatus according to claim 1, wherein the bottom of the hopper means comprises a rear inclined wall for guiding the gravity falling fodder near the opening thereof.

7. An apparatus according to claim 6, wherein the hopper means comprises a front inclined wall having an inclination with reference to the vertical which is greater than the inclination of the rear inclined wall.

8. An apparatus according to claim 1, wherein the hopper means comprises two opposite lateral openings for allowing livestock on two rows to directly eat the fodder simultaneously, the openings being located on walls having respectively an inclination with reference to the vertical axis so that the bottom of the hopper means is larger than the upper part thereof.

9. An apparatus according to claim 1, further comprising container means for distributing lay, the container means being connected to the hopper means for movement in tandem.

10. A feed distributing apparatus for repetitive delivering of feeds to livestock set according to a predetermined configuration and in front of which an overhead rail extends, the apparatus comprising:
    hopper means for receiving fodder and having at least one lateral opening adjacent the bottom thereof for allowing livestock to directly eat the fodder internally settling substantially by gravity near the opening;
    container means for receiving hay, the container means having a wire screen wall on at least one lateral side thereof for retaining hay and allowing livestock to directly eat the hay through meshes in the wire screen wall; and
    a carriage unit comprising:
       first carriage means operatively engageable with the overhead rail and attached to the hopper means for supporting the hopper means above the ground and allowing movement thereof along the overhead rail;
       second carriage means operatively engageable with the overhead rail and attached to the container means for supporting the container means above the ground and allowing movement thereof along the overhead rail;
       hitching means for operatively attaching in tandem the hopper means and the container means;
       driving means operatively engageable with the overhead beam for moving the hopper means and the container means along the overhead rail; and
       control means for controlling the driving means.

11. An apparatus according to claim 10, wherein the driving means comprises an electrical motor mechanically connected to wheels operatively engageable with the overhead rail.

12. An apparatus according to claim 11, wherein a battery is electrically connected to the electrical motor for supplying power to the motor.

13. An apparatus according to claim 11, wherein the driving means is an independent driving carriage operatively attached to the first or the second carriage means.

14. An apparatus according to claim 10, wherein the first and the second carriage means comprise swivels having a respective vertical axis for allowing movement of the hopper means and the container means along curved sections of the overhead rail.

15. An apparatus according to claim 14, further comprising a balance for measuring the weight of the hopper means, the balance comprising at least one strain gauge mounted on the swivels of the hopper means and electrically connected to a control panel.

16. An apparatus according to claim 14, further comprising a balance for measuring the weight of the container means, the balance comprising at least one strain gauge mounted on the swivels of the container means and electrically connected to a control panel.

17. All apparatus according to claim 10, wherein the bottom of the hopper means comprises a rear inclined wall for guiding the gravity falling fodder near the opening thereof.

18. An apparatus according to claim 17, wherein the hopper means comprises a front inclined wall having an inclination with a reference to the vertical which is greater than the inclination of the rear inclined wall.

19. An apparatus according to claim 10, wherein the hopper means comprises two opposite lateral openings for allowing livestock on two rows to directly eat the fodder simultaneously, the openings being located on walls having respectively an inclination with reference to the vertical axis so that the bottom of the hopper means is larger than the upper part thereof.

20. An apparatus according to claim 10, wherein the container means has a substantially funnel-shaped cross-section.

* * * * *